Patented July 21, 1953

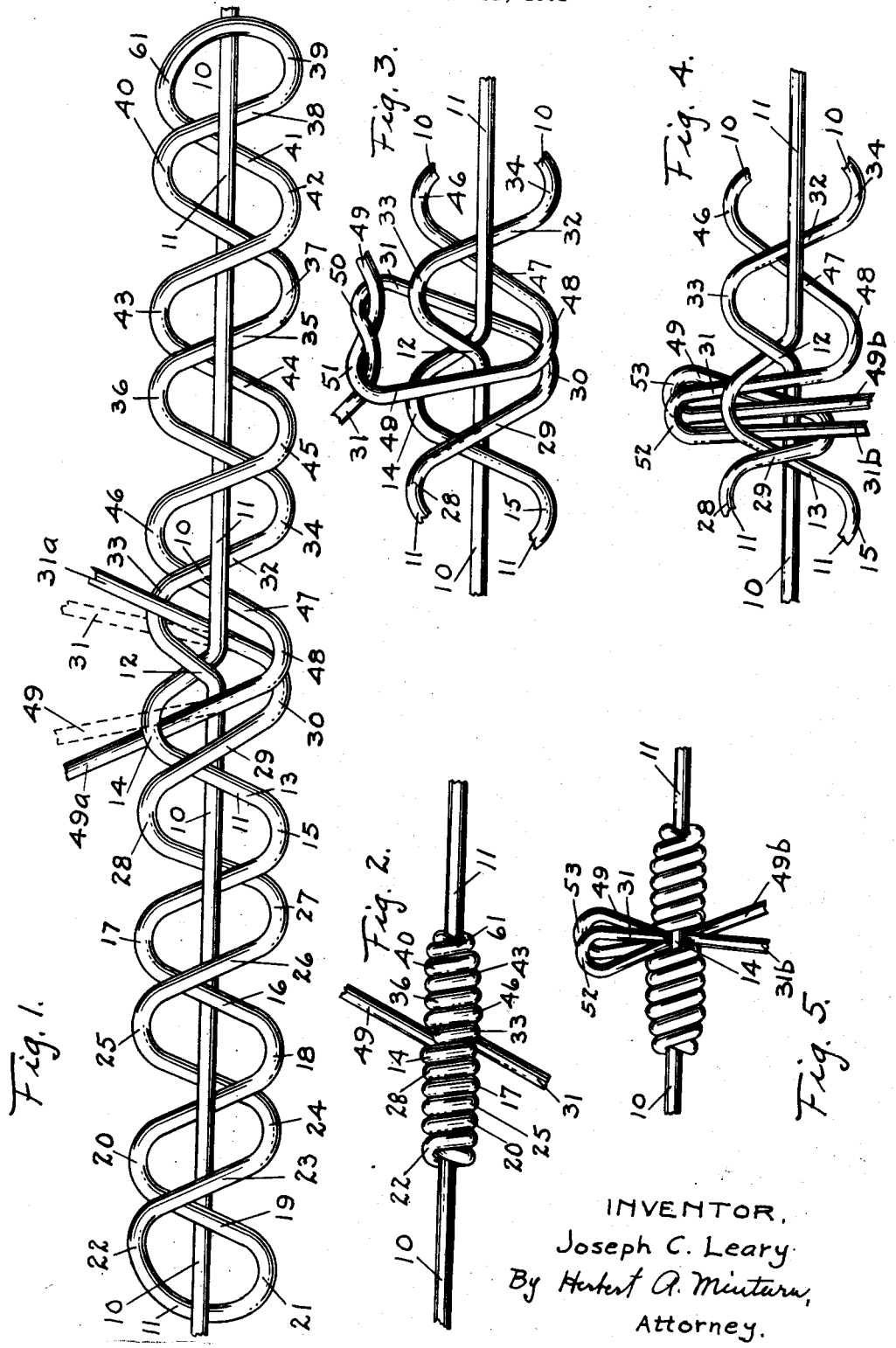

2,645,840

UNITED STATES PATENT OFFICE 2,645,840

BALE TWINE TIE

Joseph C. Leary, Greenfield, Ind.

Application January 11, 1951, Serial No. 205,450

9 Claims. (Cl. 28—78)

This invention relates to a knot for securing together ends of materials such as flexible metal wire, and cordage in general, including strings, twine, yarn, rope, as formed from sisal, hemp, cotton, wool, and in fact any of the fibers to be employed in making these elements.

The invention is particularly adapted for use where high tensile strength is required, one such use being for example in the tying of baler twine in the act of baling straw and hay and the like where the twine has to resist high tensile loads not only under the tendency of the bale to increase its length after having been tied, but also to resist the shocks of dropping the bales off of wagons, and also in dropping the bales from hay carriers and the like in the mows where the bales are to be stored.

One of the peculiar characteristics of the knot embodying the present invention lies in the fact that the twine will break any place under sufficient tensile stress other than in the knot itself. In other words the knot becomes a stronger portion of the length of the two interconnected pieces of twine than is the twine itself, or any zone of the twine outside of the knot.

The term "twine" will be hereinafter employed as a generic term to include all of the wires or cordage and yarns as above listed, or anything in the nature of a flexible string.

A further primary advantage of the invention lies in the fact that the knot serves as a cushion to the length of the twine when the twine is subjected to a sudden jerk or shock, in that the knot itself will tend to contract further so as to provide a certain amount of "give."

Another important characteristic of the knot resides in the fact that there is no sharp intercrossing of the twine within the knot where one portion of the twine will be brought sharply across another portion which normally sets up a shearing action tending to cut the twine in two. The knot of the present invention avoids such intercrossing. In fact the knot is a wrap-around formation setting up a frictional grip of one portion of the twine against another portion so that there is no shearing action whatsoever to be had at any point within the knot itself.

These and many other objects and advantages of the invention including the simplicity of setting up the knot, will become apparent to those versed in the art in the following description of the invention as illustrated in the accompanying drawing, in which Fig. 1 is a view in top plan of the knot forming the invention in schematic diagram with the turns widely spaced apart for clarification as to the structure;

Fig. 2 is a view of the knot in finished, compact form;

Fig. 3 is a view in schematic diagram of the central portion of the knot with the outer turns, as illustrated in Fig. 1, omitted from the view and with a modified form of the interengagement of the ends of the twine;

Fig. 4 is a similar schematic diagram of the central portion of the knot with the outer turns, as illustrated in Fig. 1, omitted from the view and showing a modified form of engagement of the ends of the twine; and Fig. 5 is a view of the knot when pulled up snugly employing the end engagement as shown in Fig. 4.

Referring first to that form of the knot as illustrated in Figs. 1 and 2, two end portions 10 and 11 of twine are brought up one toward the other to have those portions in substantial axial alignment one with the other, and to have the portions 10 and 11 crossed at the intersection 12.

From the intersection 12, the portion 11 is given three complete turns around the portion 10 immediately to the left of the intersection 12 as viewed in Fig. 1. These turns can best be described by referring to them as the turn 13 having the upper bight 14 and the lower bight 15; the turn 16 having the upper bight 17 and the lower bight 18; and the turn 19 having the upper bight 20 and the lower bight 21.

From the outer bight 21, the twine portion 11 is then brought around and over forming the upper bight 22 to wrap around the twine portion 10 outside of the other turns 19, 16, and 13, by three additional turns 23 having the lower bight 24, and the upper bight 25; the turn 26 having the lower bight 27 and upper bight 28; and the turn 29 having the lower bight 30 from which the twine 11 continues upwardly initially in the dotted line position to terminate in the end portion 31. Thus it is to be seen that the twine end portion 31 is carried from the intersecting zone 12 three times around the twine 10 in the one direction and then is turned back over those turns three more times to bring the end 31 back up in juxtaposition with the intersection 12.

In the same manner, the twine portion 10 is carried from the intersection 12 around the twine 11 by three complete turns outwardly in the one direction to be carried back over those turns with three more turns to bring the end back adjacent the intersection 12.

Specifically the end portion 10 leaves the intersection 12 by the turn 32 having the upper bight 33 and the lower bight 34; the second turn 35 having the upper bight 36 and the lower bight 37; and then the third turn 38 having the lower bight 39 and the upper bight 40. The twine 10 is continued into the upper bight 61 to have a turn 41 with the lower bight 42 and the upper bight 43; a second turn 44 with the lower bight 45 and the upper bight 46; and the third turn 47 with the lower bight 48 from which the twine continues by the end portion shown in the original position by the dash lines 49.

It is to be noted that the ends 31 and 49 are brought up on opposite sides, that is the end 31 is on the back side of the twine 11 and the bight 33 whereas the end 49 is on the front side of the twine 10 and the bight 14.

Now if these ends 31 and 49 be suitably held in substantially parallel relation one with the other, all that needs to be done is to pull the twine portions 10 and 11 one away from the other in axial directions, whereupon the various turns will be drawn up into the positions as indicated in Fig. 2. However, as a factor of safety it is preferred that these ends 31 and 49 be engaged in some manner as to prevent their tendency to unwrap, and one such way is shown in the simple form in Fig. 1 wherein the end portion 49 is tucked over the twine 10 and under the bight 14 into the solid line position as designated by the numeral 49a. In like manner the end 31 is brought up from the underside of the twine 11 and under the bight 33 into the position as indicated by the numeral 31a. The drawn up knot in its compacted form will still assume the same configuration as shown in Fig. 2.

A further modification of securing the ends 31 and 49 is indicated in Fig. 3 wherein the ends 31 and 49 are given a single turn 50 and 51 respectively one over the other, to have the turns pulled up tightly to bring the ends 31 and 49 down against the intersection 12 between the bights 14 and 33.

A still further modified form of securing the ends 31 and 49 together is indicated in Figs. 4 and 5, this form particularly adapting itself for mechanical tying of the knot.

In this form, the ends are each looped back upon themselves to define the looped ends 52 and 53 respectively. These loops 52 and 53 are then inserted either over the twine 10 or the twine 11 whichever may be preferable to carry those loops under the bights 14 or 33 as the case may be, the loops 52, 53, herein being shown, Fig. 4, as being carried over the twine 10 and under the bight 14. These loops are only carried through the bight 14 far enough to carry them therebeyond and still leave the end portions 31b and 49b extending outwardly over the twine 10. Then the twine 10 and twine 11 are relatively pulled one away from the other axially, whereupon the knot then comes up into its compacted form to take the general configuration as shown in Fig. 5.

However, in any event, in reference to the securing of the twine ends, the knot consists essentially of having the three outwardly extending turns and three inwardly extending turns of twine on each side of the original intersecting zone of the two twines 10 and 11. While the twines have been referred as having the intersection 12, this intersection does not cause the twines to be sharply pulled one over the other, but instead, when the twines 10 and 11 are put under strain and stress, this zone 12 in effect becomes two parallel portions approximately of the twine 10 and 11. This is indicated somewhat in Fig. 5, where the bight 14 approaches the parallel position with the axes of the twines 10 and 11. Each turn of the twines about their respective straight lengths sets up a frictional grip, this grip being extremely effective even though the twines be made out of a hard finished material such as when the material is sisal. Where the twine has an extremely soft finish and of lowered tensile strength, such as in yarns, and some of the softer fibers such as cotton, wool, or other vegetable fibers as are commonly used in the softer twines, the number of outside turns coming back from the outer ends of the initial turns may be increased in order to set up a slightly greater wrapping effect, this number of outside turns being increased preferably to four instead of the three as above indicated. In all other respects however the knot remains exactly the same, and the action is the same. The important result is that the twine will not break at any point or zone within the confines of the knot, and has no tendency to break at the outer ends of the knot other than would sometimes occur should there be a reduced section of the twine at that position. As a matter of fact, the twine almost universally will break at a distance removed from the outside of the knot under the most extreme pull thereon.

As above indicated, this particular knot has an unusual ability to absorb shocks set up by sudden jerks or pulls upon the twines 10 and 11 outwardly from the knot. This of course is readily seen as being possible by reason of the large number of turns and reverse turns of the twine in forming the knot, these turns each forming a resilient length which can be pulled tighter if necessary under the extreme pull set up on the twines 10 and 11 so that the shock is not necessarily absorbed in the twines 10 and 11 itself, but is gradually taken up by these turns in an extenuated manner so that the shock is gradually dissipated throughout the turns in the knot, thereby removing the danger of breakage of the twine 10 and 11 under such shocks up to certain points of course. In other words the knot itself cushions the twine 10 and 11 in each instance so that it will not normally break under such conditions, for example, as when a bale tied with such twine and such a knot is dropped from a height, since the shock initially occurring upon that drop is quickly removed when the bale bounces over onto its side, or the like. In that initial sudden shock, the knot sufficiently absorbs the increased pull on the twine.

The knot is particularly indicated for usage in tying baler twine in the process of baling hay or straw, where the twine is provided with a normal 270 pound tensile strength, a strength which the knots heretofore used will not support since the knots frequently break and let the bales fly apart with the resultant loss thereof. In fact this breakage of knots in baling operations has become a great problem, and the solution of that problem has long been awaited. The present invention is a solution thereof.

While I have herein shown and described my invention in the one particular form, it is obvious that structural changes may be made such as those suggested in the securing of the ends of the two twine end portions to be tied; and I therefore do not desire to be limited to that precise form beyond the limitations which may be imposed by the following claims.

I claim:
1. A knot for tying together two end portions of twine comprising a central lapping zone of those portions, from which zone the twine extends in outwardly opposite directions by initial three turns each from that zone and extends in inwardly opposite directions by a second set of three turns each from the outer ends of said initial turns to have the ends of said portions terminate across said portions adjacent said zone; said turns having bights over the respective twine portions; and said ends extending through at least one of said bights adjacent said lapping zone across one of said twine portions.

2. A knot for tying together two end portions of twine comprising a central lapping zone of those portions, from which zone the twine extends in outwardly opposite directions by initial three turns each from that zone and extends in inwardly opposite directions by a second set of three turns each from the outer ends of said initial turns to have the ends of said portions terminate across said portions adjacent said zone; said turns having a bight over the respective twine portions adjacent said lapping zone; said ends being inter-tied across the outer sides of said bights.

3. A knot for tying together two end portions of twine comprising a central lapping zone of those portions, from which zone the twine extends in outwardly opposite directions by initial three turns each from that zone and extends in inwardly opposite directions by a second set of three turns each from the outer ends of said initial turns to have the ends of said portions terminate across said portions adjacent said zone; said turns having a bight at each side of said lapping zone; and said ends extending one through one of said bights, and the other end through the other bight.

4. A knot for tying together two end portions of twine comprising a central lapping zone of those portions, from which zone the twine extends in outwardly opposite directions by initial three turns each from that zone and extends in inwardly opposite directions by a second set of three turns each from the outer ends of said initial turns to have the ends of said portions terminate across said portions adjacent said zone; said turns having bights adjacent said lapping zone; said ends being looped and extending between one of said bights and one of said twine portions by its looped portion.

5. A knot between two end portions of twine comprising a zone of overlapping of said portions from which, said portions extend in wrapped relation, one around and along the other, outwardly from said zone for a number of turns and then extend inwardly to said zone in reverse wrapped relation, one around and along the other for a number of turns to have ends of said portions in close proximity at said zone; said ends being fixed by extending between at least one of said turns and one of said end portions.

6. A knot between two end portions of twine comprising a zone of overlapping of said portions from which, said portions extend in wrapped relation, one around and along the other, outwardly from said zone for a number of turns and then extend inwardly to said zone in reverse wrapped relation, one around and along the other for a number of turns to have ends of said portions in close proximity at said zone; one of said ends being positioned under one of said turns and over one of said portions, and the other of the ends being positioned under another of said turns and over the other of said portions.

7. A knot between two end portions of twine comprising a zone of overlapping of said portions from which, said portions extend in wrapped relation, one around and along the other, outwardly from said zone for a number of turns and then extend inwardly to said zone in reverse wrapped relation, one around and along the other for a number of turns to have ends of said portions in close proximity at said zone; one of said ends being positioned under one of said turns and over one of said portions, and the other of the ends being positioned under another of said turns and over the other of said portions; both of said last turns being adjacent said zone.

8. A knot between two end portions of twine comprising a zone of overlapping of said portions from which, said portions extend in wrapped relation, one around and along the other, outwardly from said zone for a number of turns and then extend inwardly to said zone in reverse wrapped relation, one around and along the other for a number of turns to have ends of said portions in close proximity at said zone; said end portions being inter-tied across said zone outside of said turns.

9. A knot for tying together two end portions of twine having two end portions extending in outwardly opposite directions from a point of contact, each end portion extending about the other end portion in outwardly opposite directions, a plurality of turns from said point of contact and then each end portion extending inwardly a plurality of turns, said end portions and said turns lying in intimate frictional contacting relationship to form a self-sustaining knot.

JOSEPH C. LEARY.

References Cited in the file of this patent

UNITED STATES PATENTS

| Number | Name | Date |
|---|---|---|
| 1,774,898 | Novick | Sept. 2, 1930 |
| 2,239,342 | Rosenfelder et al. | Apr. 22, 1941 |
| 2,438,537 | Carter | Mar. 30, 1948 |
| 2,438,538 | Carter | Mar. 30, 1948 |
| 2,500,004 | Nielsen | Mar. 7, 1950 |

OTHER REFERENCES

Encyclopedia of Knots by Raoul Graumont and John Hensel; 3rd Edition, published in 1945 by the Cornell Maritime Press, New York.